UNITED STATES PATENT OFFICE.

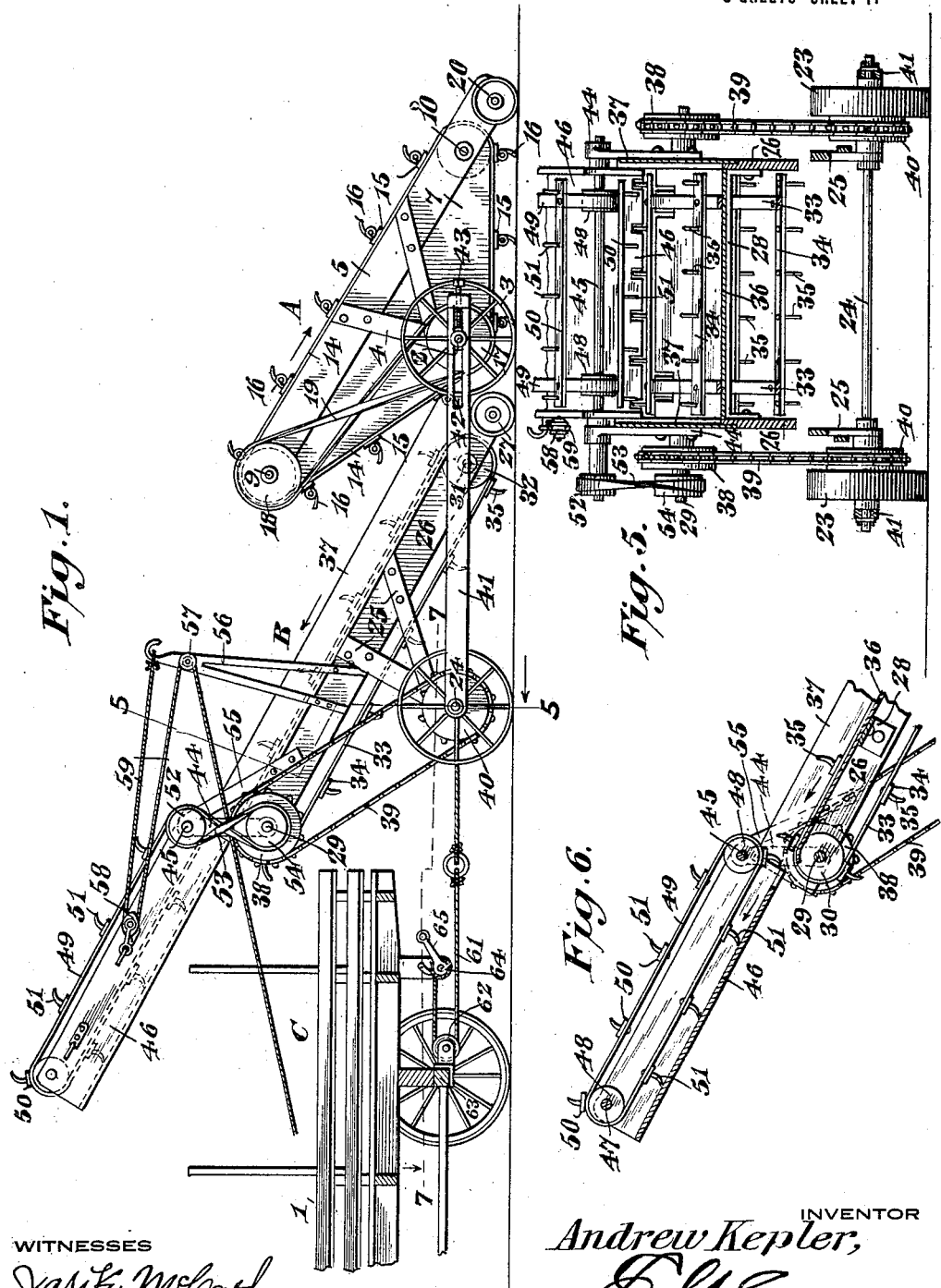

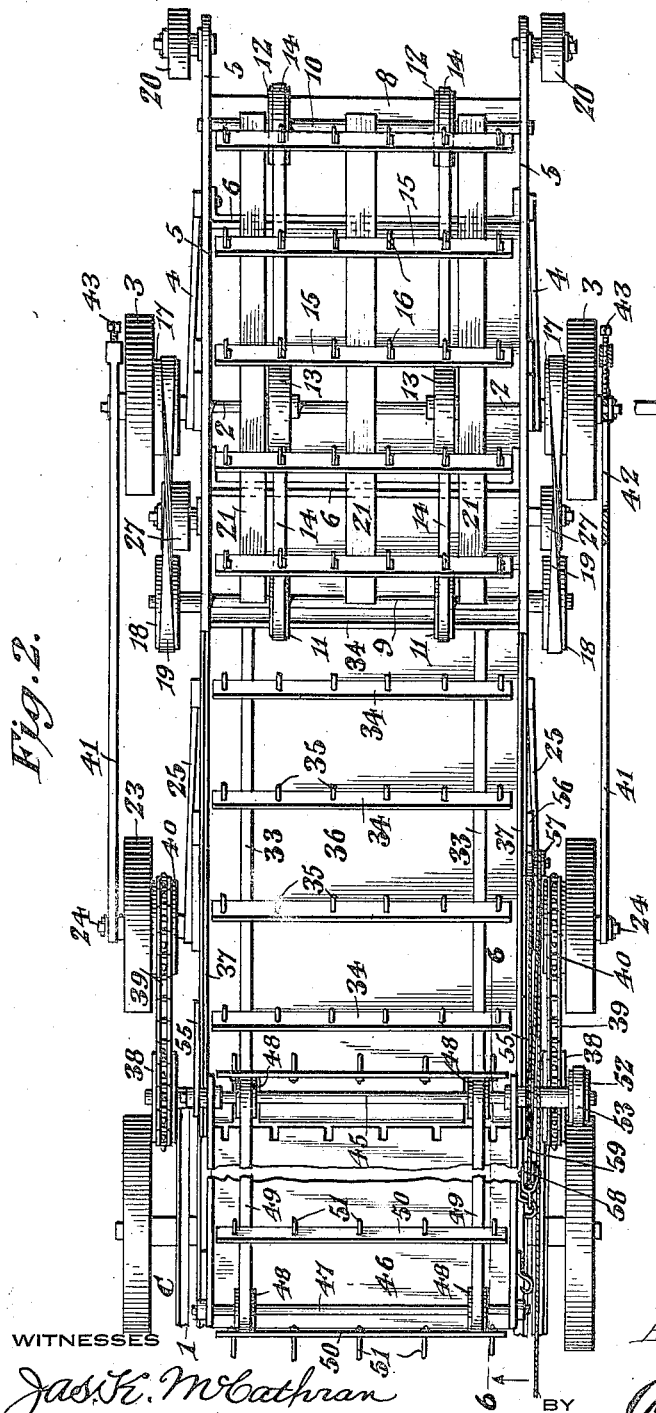

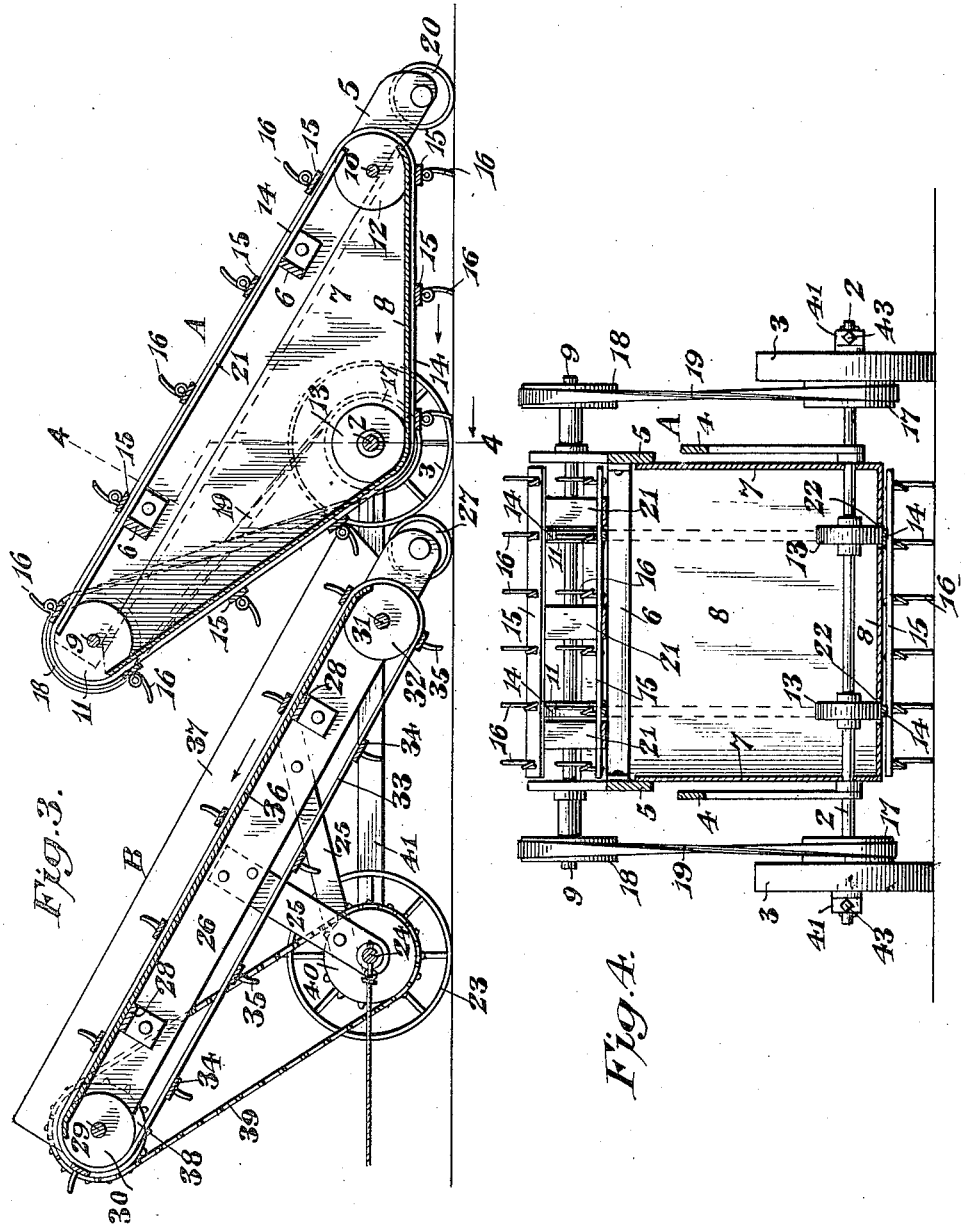

ANDREW KEPLER, OF BURTON, NEBRASKA.

HAY-LOADER.

1,295,520.   Specification of Letters Patent.   Patented Feb. 25, 1919.

Application filed June 22, 1918. Serial No. 241,409.

*To all whom it may concern:*

Be it known that I, ANDREW KEPLER, a citizen of the United States, residing at Burton, in the county of Keyapaha and State of Nebraska, have invented a new and useful Hay-Loader, of which the following is a specification.

This invention has reference to hay loaders, and its object is to provide a loader of simple construction capable of depositing the gathered hay on vehicles of different heights.

In accordance with the invention, the loader is arranged in trailing relation to the vehicle to be loaded, and comprises an elevating conveyer directly following the vehicle to be loaded and a separate gatherer following the elevator, which latter discharges directly onto the vehicle and which may be adjusted, in one form of the invention, to various heights.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified, so long as such changes and modifications come within the scope of the appended claims.

In the drawings:

Figure 1 is a side elevation of the hay loader with an elevating extension, and showing a receiving vehicle in longitudinal section;

Fig. 2 is a plan view of the loader shown in Fig. 1;

Fig. 3 is a longitudinal section of the loader, but omitting the elevating extension;

Fig. 4 is a section on the line 4—4 of Fig. 3, but omitting distant parts;

Fig. 5 is a section on the line 5—5 of Fig. 1;

Fig. 6 is a section on the line 6—6 of Fig. 2;

Fig. 7 is a section on the line 7—7 of Fig. 1; but confined to the connecting strands.

Referring to the drawings, there is shown a gatherer A and an elevator B, together with a vehicle C, these parts being arranged in tandem with the vehicle C foremost in the direction of travel, and the elevator B between the vehicle and the gatherer A.

The vehicle C, when the structure is used for gathering hay, may be provided with a hay rack 1 of any suitable form, and the vehicle may follow the usual lines of such vehicles.

The gatherer A is provided with an axle or shaft 2 carried by traction wheels 3 at opposite ends. Mounted on the shaft 2 are bars or beams 4 carrying longitudinally disposed inclined timbers 5 joined by bars or braces 6. The gatherer is of generally inverted triangular shape, with the shaft or axle 2 extending through the apex portion of the triangle, which apex, because of the inversion of the triangle, is lowermost. The gatherer is provided with side walls 7 and a bottom wall 8, which in part is substantially parallel with the surface over which the gatherer travels, and in part inclines toward the upper corner of the gatherer.

Traversing the gatherer frame at the two corners other than that traversed by the shaft 2 are other shafts 9 and 10 respectively. The shaft 9 has band wheels 11 thereon, the shaft 10 has band wheels 12 thereon, and the shaft 2 has band wheels 13 thereon, these band wheels all being in alinement with each other longitudinally of the gatherer, and each set of band wheels carries an endless band 14.

The bands have flights 15 fast thereto, each flight being provided with a suitable number of elastic fingers 16 designed to engage material which may be deposited on the ground and carry it along with the fingers to an appropriate point of disposal.

On the shaft 2 are pulleys 17, and on the shaft 9 are other pulleys 18 in alinement with the pulleys 17 and connected thereto by belts 19, which latter, in the showing of the drawings, are crossed belts.

The timbers or beams 5 are continued beyond the lowermost end of the triangular portion of the gatherer, and there are provided with supporting wheels 20 designed to travel on the ground and together with the traction wheels 3 support the gatherer as a whole.

The arrangement of the gatherer is such that when it is drawn over the ground from right to left, as shown in Figs. 1 and 3, the forward rotation of the traction wheels 3 causes a reverse rotation of the pulleys 18 and shaft 9, wherefore the flights 15 are caused to travel over the ground in the same direction as the travel of the gatherer as a whole, but at a higher speed, due to the relation of the traction wheels 3 to the parts driven thereby. The lower or ground run of the flights of the gatherer constitutes the active flight, since the upwardly inclined flight where leaving the ground is arranged to deliver a gathered load to parts to be described, while the return flight, which is an inactive flight, is downwardly and rearwardly toward the ground. Since the return run is an inactive run, the flights 15 are supported by strips 21. The bottom 8 is provided with longitudinal slots 22 where the rollers 11, 12 and 13 occur, so that these rollers may there engage the bands 14 to support them and also to propel these bands and the flights 15.

The elevator B is also of generally triangular form, and comprises traction wheels 23 fast to a shaft or axle 24. Carried by the shaft 24 are braces 25 supporting inclined side beams 26, each of which at the lower end is supported by a wheel 27 designed to travel on the ground, and together with the wheels 23 support the entire elevator B.

The side beams 26 are joined at suitable intervals by cross bars 28, and at the upper end have journaled in them a shaft 29 carrying rollers 30 between the beams 26. Near the lower end the beams 26 have a shaft 31 journaled therein, and each shaft has rollers 32 mounted thereon between the beams.

The rollers 30 and 32 are in alinement lengthwise of the conveyer, and the alined rollers support belts 33 to which are secured cross flights 34 having fingers 35 thereon. Beneath the upper run of the conveyer flights 34, and also supporting the upper runs of the belts 33 is a flooring or platform 36 extending across the conveyer from side to side. This platform serves to support material carried along by the conveyer flights, while aprons 37 on opposite sides of the conveyer maintain the material on the conveyer while being elevated.

The shaft 29 carries sprocket wheels 38 on opposite ends, and these sprocket wheels are connected by sprocket chains 39 to other sprocket wheels 40 on the shaft 24, whereby the conveyer belt is propelled by power due to the travel of the conveyer structure B over the ground.

Material gathered by the fingers 16 of the gathering belt of the gatherer A is deposited upon the lower end of the elevator B, being there caught by the fingers 35 and caused to travel upwardly over the floor 36 between the aprons 37 to the upper end of the elevator, at which point the material so elevated may be discharged into a suitable receptacle such as the vehicle C.

In order to maintain the gatherer A and elevator B in proper relation, strips 41 each have one end connected to the shaft or axle 24 and the other end provided with an elongated slot 42 through which the appropriate end of the shaft or axle 2 extends. By means of an adjusting screw 43 the strips 41 may be properly located on the shaft 2 and there held so that the gatherer A is maintained in proper relation to the elevator B to deliver the gathered material onto the flights of the elevator B to be carried thereby to the top of the elevator.

The shaft 29 carries hinge straps 44 near opposite ends, and these straps are in turn connected to and carry a shaft 45 at one end of a channel member 46 constituting the frame of a conveyer extension. The other end of the channel member 46 carries a shaft 47 and on the two shafts 45 and 47 there are mounted rollers 48 carrying belts 49 to which are secured flights 50 with fingers 51. The channel member 46, the belts 49 and flights 50 constitute a supplemental elevating conveyer forming an extension of the conveyer B. The shaft 45 is provided at one end with a pulley 52 receiving a crossed belt 53 driven by another pulley 54 on the shaft 29. Straps 55 aid in bracing the shaft 45 about which the conveyer channel 46 may be adjusted. To accomplish such adjustment, a post 56 is mounted on one of the side beams 26 of the conveyer B. Suitable pulleys 57 and 58 on the post 56 and on the channel 46, together with a cord or strand 59 serve to support and adjust the inclination of the supplemental conveyer represented by the channel 46.

In order to attach the vehicle C to the elevator B, different arrangements may be used, and one such arrangement is illustrated in the drawings, and more particularly in Fig. 7, but also indicated in Figs. 1 and 3. Fast to the shaft 24 on the running gear of the elevating conveyer B is a cable or other flexible strand 61 carried about a direction changing pulley 62 on a cross bar 63 of the running gear of the vehicle C. The strand 61 is returned to a shaft 64 also on the vehicle, which shaft is under the control of a crank 65 within access of an operator. By means of the crank 65, the relation of the vehicle to the discharge end of the elevator extension 46 may be changed as needed, even while the structure is in operation.

By means of draft animals or a tractor, the vehicle C is drawn along over the field from which the hay is to be gathered, such direction being from right to left in the arrangement shown in Fig. 1. This means that the upper run of the conveyer belts in the main part of the elevator B moves in the direction of travel and constitutes the active run of the conveyer belts or flights. On account of the crossed belt 53, the lower run of the flights 50 of the supplemental or extension conveyer 56 is the one that is active and moves in the direction of travel of the vehicle, these flights traveling over the bottom of the channel member 46.

The flights 15 of the gatherer, which are toward the ground, are the active flights, and move in the same direction as the travel of the vehicle.

As the entire assemblage moves over the ground, the active run of the flights of the gatherer collects hay or other material from the ground and delivers it to the lower end of the elevator B where such gathered hay is caught by the fingers 35 of the upper run of the conveyer belts, any hay which may cling to the fingers 16 being stripped therefrom and moved over the floor 36 to the upper end of the elevator B where such hay is in turn caught by the fingers 51 of the flights 50 and caused to move along the bottom of the channel 46 to be ultimately discharged from the upper end thereof to fall into the vehicle C.

What is claimed is:—

1. A hay loader comprising a structure movable along the ground and provided with elevating conveyer members and ground engaging members for propelling the elevating conveyer members, and a gatherer separate from the elevating conveyer and provided with ground engaging members individual thereto and endless gathering means propelled by the ground engaging members and delivering onto the lower end of the elevating conveyer, and means for connecting the gatherer to the elevating conveyer structure.

2. A hay loader comprising an elevating conveyer structure and a gatherer constituting two separate instrumentalities, each provided with traveling flights, with the flights of the gatherer delivering onto the flights of the elevating conveyer, and each having driving means for the respective flights for engaging the ground and supporting and individual to the respective instrumentalities, and members connecting the gatherer and the elevating conveyer structure.

3. A hay loader comprising an elevating conveyer and a gatherer constituting two separate instrumentalities, each provided with traveling flights, with the flights of the gatherer delivering onto the flights of the elevating conveyer, and each having driving means for the respective flights for engaging the ground and supporting and individual to the respective instrumentalities, and connecting means between the elevating conveyer structure and the gatherer structure for causing the gatherer to move with and behind the elevating conveyer.

4. A hay loader comprising an elevating conveyer and a gatherer constituting two separate instrumentalities, each provided with traveling flights, with the flights of the gatherer delivering onto the flights of the elevating conveyer, and each having driving means for the respective flights for engaging the ground and supporting and individual to the respective instrumentalities, and connecting means between the elevating conveyer structure and the gatherer structure for causing the gatherer to move with and behind the elevating conveyer, said connecting means having adjusting means whereby the two instrumentalities may be maintained in proper relation for the gatherer to deliver gathered material onto the flights of the elevating conveyer.

5. A hay gathering structure comprising an inclined elevating conveyer with traction wheels intermediate of its length connected to and driving the elevating elements of the conveyer, and other supporting wheels at the rear end of the elevating conveyer, and a gatherer connected to and following the conveyer and provided with traction wheels intermediate of its length and connected to and driving the gathering elements and with supporting wheels at its rear end.

6. A hay gatherer comprising an elevating conveyer structure having an inclined frame with supporting traction members and an endless conveyer having an active run in an upward direction toward the high end of the conveyer structure, and an inclined gatherer structure separate from and connected to the conveyer structure and overhanging the low end of the latter, said gatherer structure being provided with traction supporting means individual thereto and an endless conveyer with an active run adjacent to the ground and delivering onto the low end of the elevating conveyer structure.

7. A hay gatherer comprising an elevating conveyer and a gatherer associated with, connected to and delivering thereonto, the conveyer being provided with an extension of its high end adjustable with relation thereto, both the elevating conveyer and the extension having endless conveying means individual thereto with the upper run of the elevating conveyer constituting the active run and the lower run of the extension constituting the active run thereof.

8. A hay gatherer comprising an elevating conveyer structure having traction wheels and supporting wheels to the rear of the traction wheels, a gatherer structure provided with traction wheels individual thereto and supporting wheels to the rear of the traction wheels, and connecting strips joining the elevating conveyer and gatherer structures together at the traction wheels with the discharge end of the gatherer overhanging the rear end of the elevating conveyer.

In testimony, that I claim the foregoing as my own, I have hereto affixed my signature in the presence of two witnesses.

ANDREW KEPLER.

Witnesses:
FRANK J. RHODES,
WM. KRINKE.